Miles, Adle & Custer.
Corn Planter.

Nº 30,708.   Patented Nov. 27, 1860.

Witnesses
C. M. Alexander
A. A. Yeatman

Inventor
W. H. Adle
P. D. Miles
G. Custer

UNITED STATES PATENT OFFICE.

W. H. ADLE, P. D. MILES, AND G. CUSTER, OF MORRISTOWN, PA.

IMPROVEMENT IN CORN-PLANTERS.

Specification forming part of Letters Patent No. 30,708, dated November 27, 1860.

*To all whom it may concern:*

Be it known that we, WM. H. ADLE, P. D. MILES, and G. CUSTER, of Morristown, in the county of Montgomery and State of Pennsylvania, have invented certain new and useful Improvements in Corn-Planters; and we do hereby declare that the following is a clear, full, and exact description of the same, reference being had to the accompanying drawings, and to the letters of reference marked thereon, in which—

Figure 1:
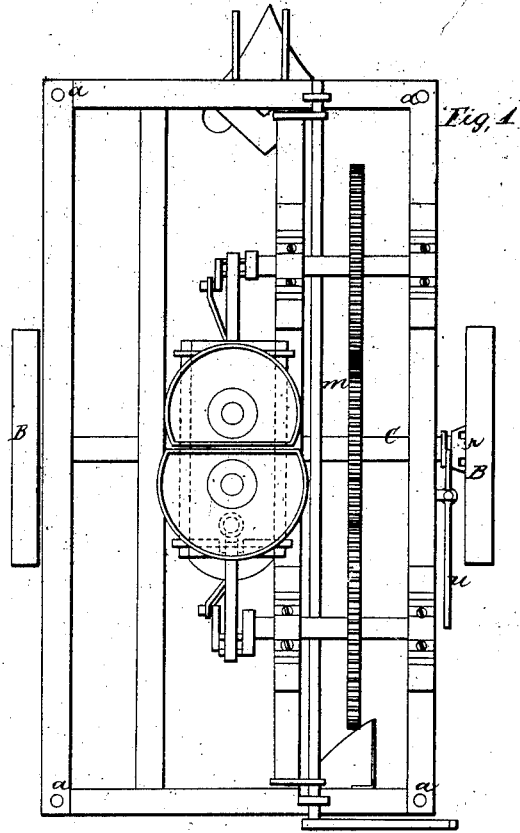
Figure 2:
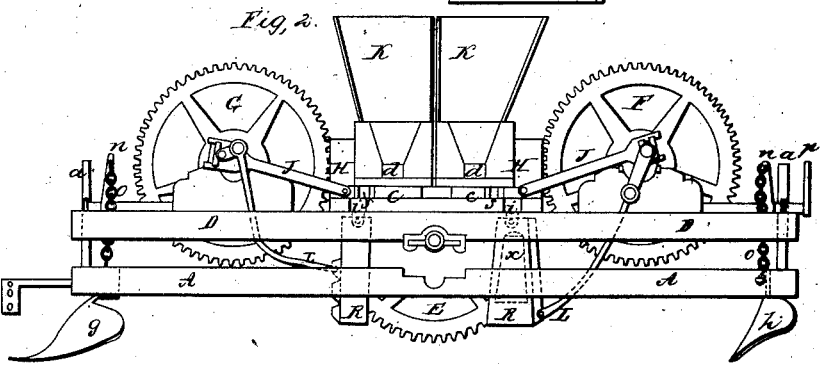

Figure 1 is a plan view, Fig. 2 a side-elevation, and Fig. 3 a vertical section, of the manure distributer.

The nature of our invention consists in the employment and combination of such devices as will be hereinafter fully set forth.

To enable others skilled in the art to make and use our invention, we will proceed to describe its construction and operation.

A and D represent two frames of equal dimensions. The bottom frame, A, is provided with four standards, $a$ $a$ $a$—one at each corner. The top frame, D, is provided with the same number of holes, through which the standards protrude for the purpose of keeping the frame A in its right position, and also to allow it being operated upon in the manner hereinafter mentioned.

C is a shaft secured on the under side and in the center of frame D.

B B are the main or driving wheels.

$g$ is a shovel-plow secured at the front end and in the center of frame A. $h$ is a side turn-plow situated at the opposite end of said frame, but a little to the right of the center. The object of the plow $g$ is to prepare a furrow for the grain and manure, while that of the plow $h$ is to follow and cover up the grain.

E represents a cog-wheel secured on shaft C. F and G are also two cog-wheels, which are secured on top of frame D, and are operated by means of the cog-wheel E in the manner shown in the drawings.

$m$ is a shaft extending longitudinally from end to end of the top frame and secured loosely to said frame by staples.

$n$ $n$ are two levers attached to the shaft $m$. To each of the levers are attached short chains $o$ $o$. The opposite ends of these chains are secured to the lower frame, A, as fully shown in Fig. 2.

$p$ is a lever at the end of shaft $m$ for the purpose of operating it. Thus it will be seen that the lower frame, A, may be either elevated or lowered by means of the lever $p$. The inner ends of the shaft, upon which the cog-wheels F and G are secured, are provided with a double or compound crank, as fully represented in Fig. 1.

J J are pitmen connecting the seed and manure slides $c$ $c$ to the short arm of the cranks.

H is a trough, in which the hoppers K K are placed. The bottom of this trough is provided with two holes for the escape of the grain and manure to the discharge-spouts R R. In the manure-discharge spout is secured a cone, $x$, for the purpose of effectually equalizing the distribution of the manure as it falls. Each of the discharge-spouts is so attached to the under side of the trough it they will rock or oscillate when operated upon in a manner hereinafter shown.

L L are rods which connect the large cranks to the discharge-spouts. The stroke of said spouts may be regulated by graduated holes in a piece of metal welded on them, as shown in Fig. 1.

$r$ represents a clutch-coupling, and $u$ a lever attached to it. Thus may the machine be readily thrown in and out of gear.

The operation of our invention is as follows: The fertilizing material, of whatever nature it may be, is placed in the hind hopper and the grain in the front one. The two plows being properly adjusted by means of lever $p$, motion is given to the machine, and the slides are forced alternately under the hoppers. When becoming filled they are drawn back over the holes in the trough, falling through into the discharge-spouts. Their contents are deposited in the same place by means of the automatic motion given to the discharge-spouts, a furrow having been previously prepared by the shovel-plow. The side turn-plow advances and covers up the grain and manure together.

Having thus fully described our invention, what we claim, and desire to secure by Letters Patent, is—

1. The combination of the two frames A and D, standards $a$ $a$, shaft $m$, and chains $o$ $o$, all being arranged substantially as and for the purpose set forth.

2. Hoppers K K, trough H, slides $c$ $c$, pitman J, connecting-rods L L, automatic discharge-spouts R R, and clutch-coupling $r$, when the whole shall be constructed and arranged substantially as and for the purpose herein set forth and described.

In witness that we claim the foregoing we have hereunto set our hands in the presence of the subscribing witnesses.

WILLIAM H. ADLE.
PRESTON D. MILES.
GEORGE CUSTER.

Witnesses:
THOS. W. POTTS,
ISAAC BOLTEN,
JAMES CROZIER,
WILLIAM J. BOLTON,
ALEXANDER HOOVEN,
HENRY BAKER.